United States Patent
Adler et al.

(10) Patent No.: US 10,686,767 B2
(45) Date of Patent: Jun. 16, 2020

(54) METHOD FOR SECURING USER DATA WITH DRM KEYS

(71) Applicant: Apple Inc., Cupertino, CA (US)

(72) Inventors: Mitchell D. Adler, Los Gatos, CA (US); Andrew Roger Whalley, San Francisco, CA (US)

(73) Assignee: Apple Inc., Cupertino, CA (US)

(*) Notice: Subject to any disclaimer, the term of this patent is extended or adjusted under 35 U.S.C. 154(b) by 192 days.

(21) Appl. No.: 15/274,999

(22) Filed: Sep. 23, 2016

(65) Prior Publication Data

US 2017/0222992 A1 Aug. 3, 2017

Related U.S. Application Data

(60) Provisional application No. 62/290,239, filed on Feb. 2, 2016.

(51) Int. Cl.
| | |
|---|---|
| *H04L 29/06* | (2006.01) |
| *G06F 21/10* | (2013.01) |
| *H04L 9/08* | (2006.01) |
| *G06F 21/31* | (2013.01) |
| *G06F 21/78* | (2013.01) |

(Continued)

(52) U.S. Cl.
CPC ............ *H04L 63/061* (2013.01); *G06F 21/10* (2013.01); *G06F 21/31* (2013.01); *G06F 21/35* (2013.01); *G06F 21/6209* (2013.01); *G06F 21/78* (2013.01); *H04L 9/0841* (2013.01); *H04L 9/0894* (2013.01); *H04L 63/102* (2013.01); *H04L 2209/603* (2013.01); *H04L 2463/101* (2013.01)

(58) Field of Classification Search
CPC ............. H04L 63/061; H04L 2463/101; H04L 63/102; H04L 9/0894; H04L 9/0841; H04L 2209/603; G06F 21/10; G06F 21/78; G06F 21/6209; G06F 21/35; G06F 21/31
See application file for complete search history.

(56) References Cited

U.S. PATENT DOCUMENTS

| | | | |
|---|---|---|---|
| 7,185,363 B1* | 2/2007 | Narin | G06F 21/10 726/18 |
| 7,509,685 B2* | 3/2009 | Lambert | G06F 21/10 705/55 |
| 7,549,056 B2* | 6/2009 | Carr | G06F 21/10 713/165 |

(Continued)

*Primary Examiner* — Mahfuzur Rahman
(74) *Attorney, Agent, or Firm* — Morgan, Lewis & Bockius LLP

(57) ABSTRACT

Some embodiments provide convenient auto-authentication for user data on a primary device, while still providing a significant level of security, by taking advantage of existing security and cryptographic measures used to communicate with a secondary device. The primary device of some embodiments encrypts the user data on the primary device using a cryptographic key based on a set of keys received from the secondary device. In some embodiments, the primary device encrypts authentication data, or a local key generated from the authentication data, using a remote key received from the secondary device, and encrypts the user data with the local key. In some embodiments, the keys received from the secondary device are an existing set of keys for establishing an encrypted channel of communication for transmitting digital rights management (DRM) protected content according to a DRM protection scheme.

23 Claims, 11 Drawing Sheets

(51) Int. Cl.
*G06F 21/35* (2013.01)
*G06F 21/62* (2013.01)

(56) References Cited

U.S. PATENT DOCUMENTS

| | | | | |
|---|---|---|---|---|
| 7,865,964 | B2 * | 1/2011 | Narin | G06F 21/10 |
| | | | | 726/30 |
| 7,937,750 | B2 * | 5/2011 | Mahalal | G06F 21/10 |
| | | | | 455/410 |
| 8,166,508 | B2 * | 4/2012 | Mitsuji | G06Q 30/06 |
| | | | | 386/349 |
| 2002/0073033 | A1 * | 6/2002 | Sherr | G06F 21/10 |
| | | | | 705/51 |
| 2007/0124809 | A1 * | 5/2007 | Narin | G06F 21/10 |
| | | | | 726/6 |
| 2009/0018963 | A1 * | 1/2009 | Abu-Amara | G06F 21/10 |
| | | | | 705/59 |
| 2010/0266132 | A1 * | 10/2010 | Bablani | H04L 9/0894 |
| | | | | 380/286 |
| 2012/0233674 | A1 * | 9/2012 | Gladstone | H04L 9/085 |
| | | | | 726/6 |
| 2012/0259720 | A1 * | 10/2012 | Nuzzi | G06F 21/105 |
| | | | | 705/26.1 |
| 2015/0127940 | A1 * | 5/2015 | Polehn | H04L 63/0435 |
| | | | | 713/168 |
| 2015/0186621 | A1 * | 7/2015 | Uy | G06F 21/10 |
| | | | | 726/26 |
| 2016/0019375 | A1 * | 1/2016 | Fasoli | G06F 21/10 |
| | | | | 726/30 |
| 2016/0066025 | A1 * | 3/2016 | Wang | H04N 21/43615 |
| | | | | 725/14 |
| 2016/0292395 | A1 * | 10/2016 | Pintaux | G06F 21/10 |

* cited by examiner

METHOD FOR SECURING USER DATA WITH DRM KEYS

BACKGROUND

Applications often store cached user data on a device as a user interacts with an application in order to improve performance of the application. The cached user data may be sensitive user data and may need to be protected by encrypting the data. The encryption depends on some form of entropy to obscure the data so that it cannot be retrieved without the correct entropy. In order to provide a reasonable level of security, it is desirable to maintain the entropy separately from the encrypted data. In many cases, the user data is encrypted using some form of entropy from the user (e.g., password, passcode, gesture input, etc.), so that the entropy is maintained separately from the encrypted data and so that the encrypted data cannot be accessed by anyone other than the user.

However, as applications begin to become increasingly available on more various types of devices, potential problems with requiring frequent re-authentication from the user begins to create potential problems and inconveniences. In some cases, the display is highly visible and uses an on-screen keyboard (e.g., a media streaming device that displays a user interface on a television or projector), making it difficult to enter a password (or other authentication information) without exposing it to others. In addition to being exposed, as many devices are designed with a simple interface for viewing media, they lack a convenient method for inputting a password or passcode. When a user is faced with having to frequently enter a password using an inconvenient method, the user will often use simple and unsafe authentication information (e.g., passwords), making it easier to capture user data information.

It is desirable to secure user data in a manner convenient to the user, while also maintaining a secure, separate (non-resident) entropy

BRIEF SUMMARY

In order to provide a balance between security and convenience, some embodiments provide convenient auto-authentication for user data on a primary device, while still providing a significant level of security, by taking advantage of existing security and cryptographic measures used to communicate with a secondary device. As long as the primary device remains connected to a trusted secondary device, the primary device determines that it has probably not been stolen and is in a safe location.

However, rather than simply relying on the presence of a secondary device as a second authentication method to authenticate the user, the primary device of some embodiments encrypts the user data on the primary device using a cryptographic key based on a set of keys received from the secondary device. The user data remains protected even if the primary device is stolen (e.g., from the user's house or while traveling with the primary device). By encrypting the data instead of using security policies enforced by the primary device, even if the encrypted user data is physically removed from the system (bypassing any such security policies), the user data still cannot be accessed without the set of keys from the secondary device to decrypt the data.

In some cases, the user legitimately wants to use the primary device without the secondary device (e.g., when a media device is connected to a new television). In such cases, the primary device of some embodiments re-authenticates the user and allows the user to re-retrieve their user data. In some embodiments, the set of keys received from the secondary device is used to encrypt a local key on the primary device that is based on the user's authentication and used to encrypt the user data. In such embodiments, when the user is re-authenticated, the local key is regenerated and the encrypted user data can be decrypted and restored.

In some embodiments, rather than simply storing a key on the secondary device that can be sent to the primary device, the set of keys received from the secondary device are an existing set of keys for establishing an encrypted channel of communication for transmitting digital rights management (DRM) protected content according to a DRM protection scheme. In order to establish the channel of communication, the secondary device sends a public key as a part of a key exchange that allows both devices of the communication to generate a shared key (using the public key and a set of private keys stored on the primary device). The shared key is then used to encrypt and decrypt the content transmitted between the devices. The primary device of some embodiments uses these keys (i.e., the public key, the shared key, or other keys generated based on such keys) to encrypt and decrypt user data on the primary device, ensuring that the user data cannot be retrieved without either the keys from the secondary device or authentication information from the user.

By combining the DRM protection and the user data security ecosystems, the primary device of some embodiments takes advantage of existing, secured, cryptographic systems to provide a level of security for user data on the primary device. In such a case, the keys used in the DRM system to encrypt DRM-protected content that is to be transmitted between the primary device and a secondary device are also used to encrypt user data that is to be stored on the primary device.

For example, in some embodiments, the key is received as part of high-bandwidth digital content protection (HDCP) scheme, which is used to protect content as it is transmitted across connections between devices. HDCP allows various devices that are a part of the scheme to communicate with each other, while ensuring that the DRM-protected content is not captured or transmitted to any device that is not a part of the scheme. With HDCP, each device maintains a unique set of private keys that must be kept secret. The secret keys are assigned to each device based on a license by the manufacturer, who is responsible for maintaining the secrecy of the keys.

In order to communicate, two devices (e.g., a source and a sink) perform a public key exchange to reach a shared key used to be used for transmissions between the devices. In some embodiments, the primary device uses the public key of the secondary device and/or the shared key generated from the public key. The primary and secondary devices can be sources (e.g., media streaming devices, mobile devices, computers, etc.), sinks (e.g., monitors, TVs, projectors, in-car entertainment systems, etc.), or other repeater devices that operate between a source and sink (e.g., upconverters, audio/visual receivers, splitters, etc.).

In this application, many of the examples are described with a source primary device and a sink secondary device, but this is not intended to limit the scope of the invention. As the protection of the user data and the protection of the transmitted DRM content are not directly related, it should be clear to one skilled in the art that the primary device that stores the user data need not be the same device that provides the user data. For example, in some embodiments, a sink device (e.g., an in-car entertainment system) stores user data and receives keys for encrypting the user data from a source device (e.g., the user's mobile phone).

In some embodiments, the primary device is a media streaming device that transmits DRM-protected content to a secondary device (e.g., a monitor, television, projector, etc.) that displays the content. In some such embodiments, the media streaming device caches user data and encrypts the user's data using a DRM key received from the display device (or a key generated based on such a DRM key). In other embodiments, the primary device is a mobile device (e.g., a mobile phone, tablet, laptop computer, etc.) that connects to an in-car entertainment system, which provides a key to encrypt authentication information on the mobile device. In some such embodiments, the key received from the in-car entertainment system is used to decrypt authentication information for the mobile device, allowing a user to bypass a lock screen or to access specific user content when connected to the in-car entertainment system.

In this application, several steps and elements are described with reference to HDCP, but this is not intended to limit the scope of the invention. One skilled in the art will recognize that the described invention can be used with various other cryptographic schemes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1A:
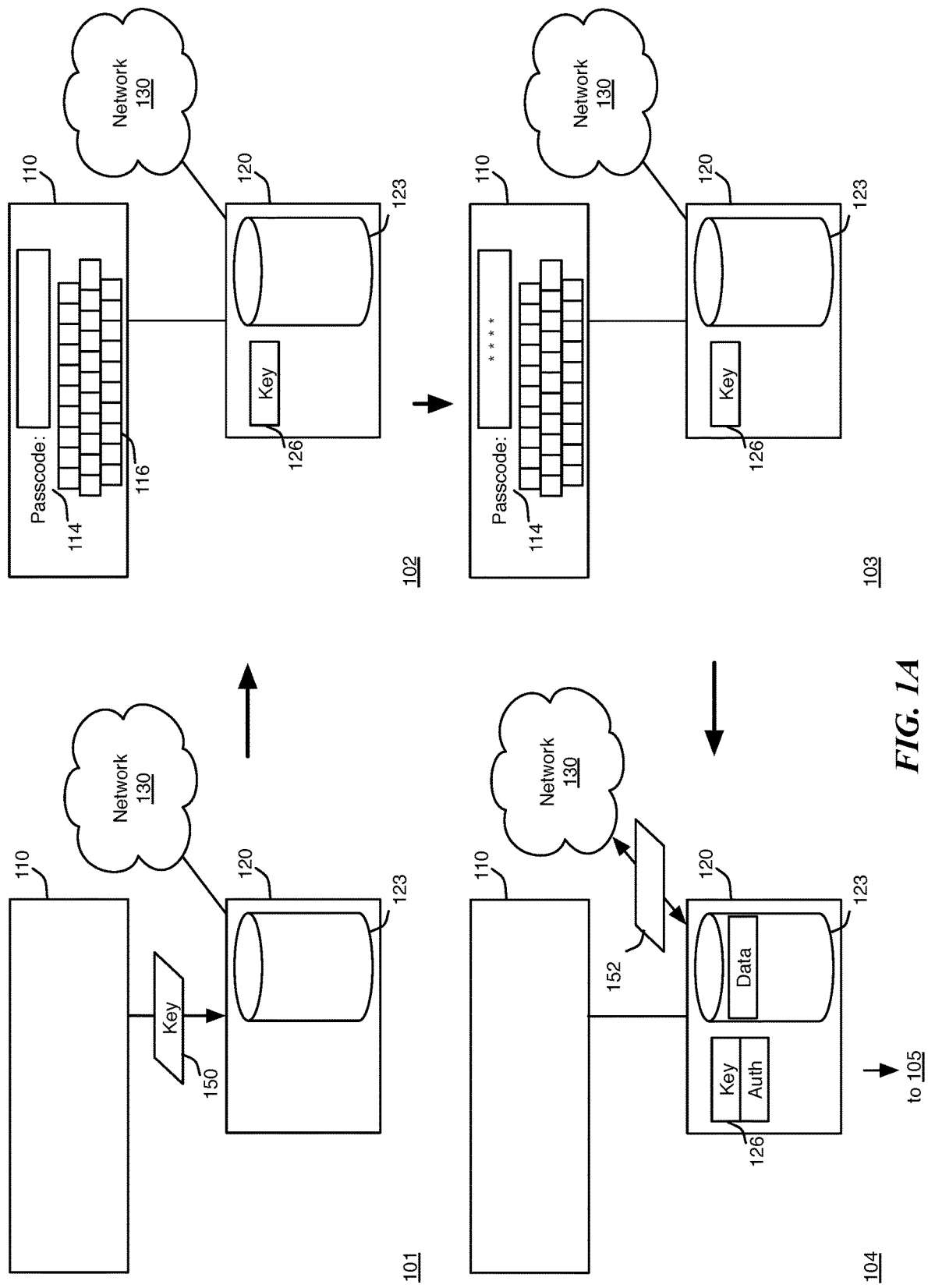
FIGS. 1A-B illustrate an example of encrypting data on a primary device using a key from a secondary device.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

In order to provide a balance between security and convenience, some embodiments provide convenient auto-authentication for user data on a primary device, while still providing a significant level of security, by taking advantage of existing security and cryptographic measures used to communicate with a secondary device. As long as the primary device remains connected to a trusted secondary device, the primary device determines that it has probably not been stolen and is in a safe location.

However, rather than simply relying on the presence of a secondary device as a second authentication method to authenticate the user, the primary device of some embodiments encrypts the user data on the primary device using a cryptographic key based on a set of keys received from the secondary device. The user data remains protected even if the primary device is stolen (e.g., from the user's house or while traveling with the primary device). By encrypting the data instead of using security policies enforced by the primary device, even if the encrypted user data is physically removed from the system (bypassing any such security policies), the user data still cannot be accessed without the set of keys from the secondary device to decrypt the data.

In some cases, the user legitimately wants to use the primary device without the secondary device (e.g., when a media device is connected to a new television). In such cases, the primary device of some embodiments re-authenticates the user and allows the user to re-retrieve their user data. In some embodiments, the set of keys received from the secondary device is used to encrypt a local key on the primary device that is based on the user's authentication and used to encrypt the user data. In such embodiments, when the user is re-authenticated, the local key is regenerated and the encrypted user data can be decrypted and restored.

In some embodiments, rather than simply storing a key on the secondary device that can be sent to the primary device, the set of keys received from the secondary device are an existing set of keys for establishing an encrypted channel of communication for transmitting digital rights management (DRM) protected content according to a DRM protection scheme. In order to establish the channel of communication, the secondary device sends a public key as a part of a key exchange that allows both devices of the communication to generate a shared key (using the public key and a set of private keys stored on the primary device). The shared key is then used to encrypt and decrypt the content transmitted between the devices. The primary device of some embodiments uses these keys (i.e., the public key, the shared key, or other keys generated based on such keys) to encrypt and decrypt user data on the primary device, ensuring that the user data cannot be retrieved without either the keys from the secondary device or authentication information from the user.

By combining the DRM protection and the user data security ecosystems, the primary device of some embodiments takes advantage of existing, secured, cryptographic systems to provide a level of security for user data on the primary device. In such a case, the keys used in the DRM system to encrypt DRM-protected content that is to be transmitted between the primary device and a secondary device are also used to encrypt user data that is to be stored on the primary device.

For example, in some embodiments, the key is received as part of high-bandwidth digital content protection (HDCP) scheme, which is used to protect content as it is transmitted across connections between devices. HDCP allows various devices that are a part of the scheme to communicate with each other, while ensuring that the DRM-protected content is not captured or transmitted to any device that is not a part of the scheme. With HDCP, each device maintains a unique set of private keys that must be kept secret. The secret keys are assigned to each device based on a license by the manufacturer, who is responsible for maintaining the secrecy of the keys.

In order to communicate, two devices (e.g., a source and a sink) perform a public key exchange to reach a shared key used to be used for transmissions between the devices. In some embodiments, the primary device uses the public key of the secondary device and/or the shared key generated from the public key. The primary and secondary devices can be sources (e.g., media streaming devices, mobile devices, computers, etc.), sinks (e.g., monitors, TVs, projectors, in-car entertainment systems, etc.), or other repeater devices that operate between a source and sink (e.g., upconverters, audio/visual receivers, splitters, etc.).

In this application, many of the examples are described with a source primary device and a sink secondary device, but this is not intended to limit the scope of the invention. As the protection of the user data and the protection of the transmitted DRM content are not directly related, it should be clear to one skilled in the art that the primary device that stores the user data need not be the same device that provides the user data. For example, in some embodiments, a sink device (e.g., an in-car entertainment system) stores user data and receives keys for encrypting the user data from a source device (e.g., the user's mobile phone).

In some embodiments, the primary device is a media streaming device that transmits DRM-protected content to a secondary device (e.g., a monitor, television, projector, etc.) that displays the content. In some such embodiments, the media streaming device caches user data and encrypts the user's data using a DRM key received from the display device (or a key generated based on such a DRM key). In other embodiments, the primary device is a mobile device (e.g., a mobile phone, tablet, laptop computer, etc.) that connects to an in-car entertainment system, which provides a key to encrypt authentication information on the mobile device. In some such embodiments, the key received from the in-car entertainment system is used to decrypt authentication information for the mobile device, allowing a user to bypass a lock screen or to access specific user content when connected to the in-car entertainment system.

In this application, several steps and elements are described with reference to HDCP, but this is not intended to limit the scope of the invention. One skilled in the art will recognize that the described invention can be used with various other cryptographic schemes.

Many examples of securing user data are described below. Section I describes securing user data using a remote key from a secondary device. Section II then describes examples of securing user data by encrypting a local key of the primary device using a remote key from a secondary device. Finally, Section III describes several example electronic systems that implement some embodiments described herein.

I. Securing User Data Using a Remote Key

Figure 1B:
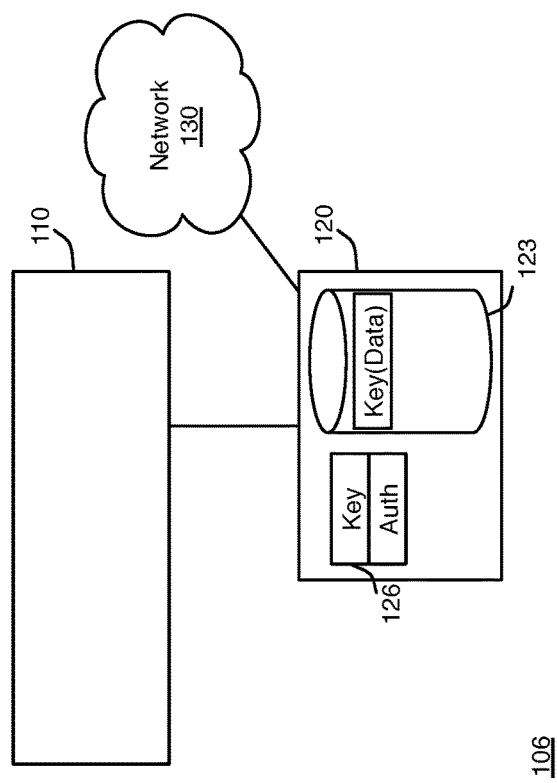

FIGS. 1A-B illustrate an example of encrypting data on a primary device using a key from a secondary device in six stages 101-106. This example shows a primary device 120, a secondary device 110, and a network 130 to which the primary device 120 is connected.

The primary device 120 of some embodiments is a device that participates in a digital rights management (DRM) connection with another device (i.e., the secondary device 110). In some embodiments, the primary device 120 collects user data from the network (e.g., from remote network data stores, cloud storage, etc.). In this example, the primary device 120 is a media streaming device that sends DRM-protected content to be displayed on the secondary device 110.

The first stage 101 shows that secondary device 110 sends a key 150 to the primary device 110. As described above, in some embodiments, the key 150 is a public key that was sent as a part of a key negotiation process used to establish a shared key to be used for communications between the primary device 120 and the secondary device 110. In some embodiments, the public key is used to encrypt the user data on the primary device 120, while in other embodiments, a negotiated key that is generated based on the public key and a set of private keys on the primary device 120 is used to encrypt the user data. In some embodiments, the primary device 120 uses the public key or the negotiated key to generate another key to encrypt the user data. In this application, the process is described with reference to the received key from the secondary device, but one skilled in the art will recognize that the key used to encrypt the user data may be the received key or any of the key generated based on the received key.

In the second stage 102, the primary device 120 has received and stored the key on the primary device. In some embodiments, the key is stored in a volatile, secured, temporary memory (e.g., cache memory) and is only maintained for a current session with the secondary device 110. As the secondary device 110 is not yet trusted by the primary device 120, the second stage 102 also shows that the secondary device 110 displays a prompt 114 for a passcode used to authenticate the user. The secondary device 110 may not yet be trusted because the primary device is still going through an initial setup, or is being setup with a new secondary device (e.g., a new projector or monitor). In some embodiments, primary device 120 attempts to authenticate the user whenever the primary device 120 first connects to a secondary device 110.

In many cases, the primary and secondary devices are designed for simple input and display and therefore lack a dedicated input (e.g., a physical keyboard) for manually inputting text into the devices. In this example, the primary device 120 displays an on-screen keyboard 116 for receiving authentication information (e.g., passcode, username, password, security token, gesture input, fingerprint data, etc.) from a user. In some embodiments, the on-screen keyboard 116 only needs to be used to authenticate a user during an initial setup of the primary or secondary devices, such that future uses of the primary device, in conjunction with the authenticated secondary device, do not require a user to re-enter their authentication information.

The third stage 103 shows that the user has entered a passcode into the prompt 114 using the on-screen keyboard 116. In some embodiments, the passcode is used to access user data (e.g., photos, documents, media, etc.) stored on the network 130. In some embodiments, the network 130 includes various cloud services, local area networks, etc.

In the fourth stage 104, the primary device 120 has stored the user's authentication information in the secure, volatile memory 126. The fourth stage 104 also shows that the primary device 120 exchanges data (e.g., network requests, login information, user data, etc.) with the network 130 to collect user data on the primary device 120.

In some embodiments, the collected user data is user data that is cached as a user utilizes the primary device 120. For example, in some cases, the primary device 120 allows a user to select the user's photos for a screen saver on the primary device 120. The user's photos are downloaded from the network 130 and stored on the device 120. However, rather than re-downloading the photos each time the primary device 120 is re-authenticated, the primary device 120 stores the downloaded photos in a storage 123. The storage 123 of some embodiments is a persistent storage that retains stored information.

In some embodiments, only certain types of information are cached. For example, the primary device 120 of some embodiments allows a user's images and media to be cached on the user device, but does not cache more sensitive information (e.g., financial information, website passwords, etc.).

The fifth stage 105 shows that the primary device 120 has stored the user data in cache memory storage 123 and sent the data to the secondary device 110. In this example, the user data is for display on the secondary device 110, but in some embodiments, the user data is not shared with the secondary device 110 at all. Rather, the primary device 120 only uses the secondary device 110 to get a key to decrypt the user data, but does not communicate the user data with the secondary device 110.

In the sixth stage 106, the user data is encrypted using the key (stored in temporary memory 126) received from the secondary device 110 and stored in non-volatile memory storage 123. By storing the encrypted user data, the user data is encrypted and protected, but can be decrypted for use later when the key from the secondary device 110 is received again. In some embodiments, the primary device 120 also encrypts the authentication information for the user so that additional data can be retrieved.

Figure 1B:
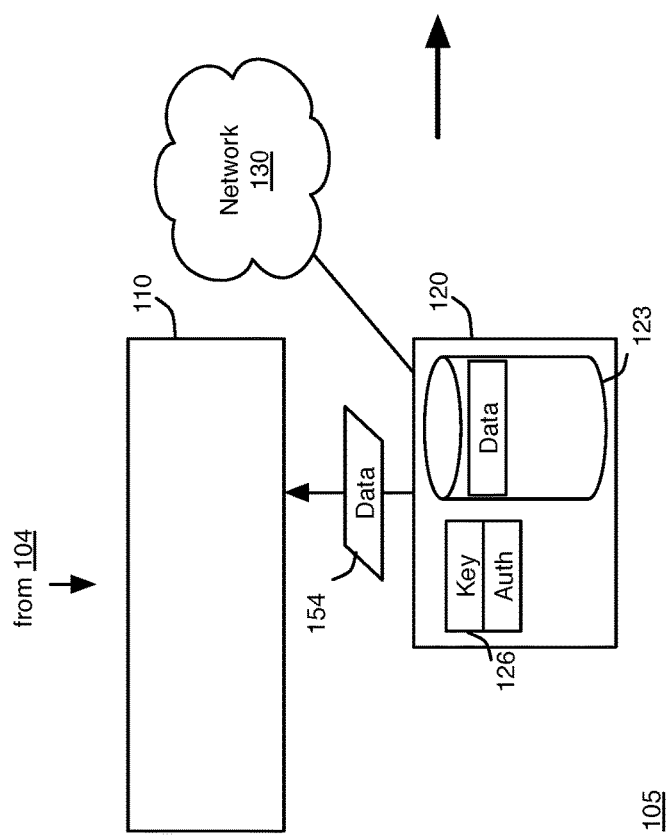
Figure 2:
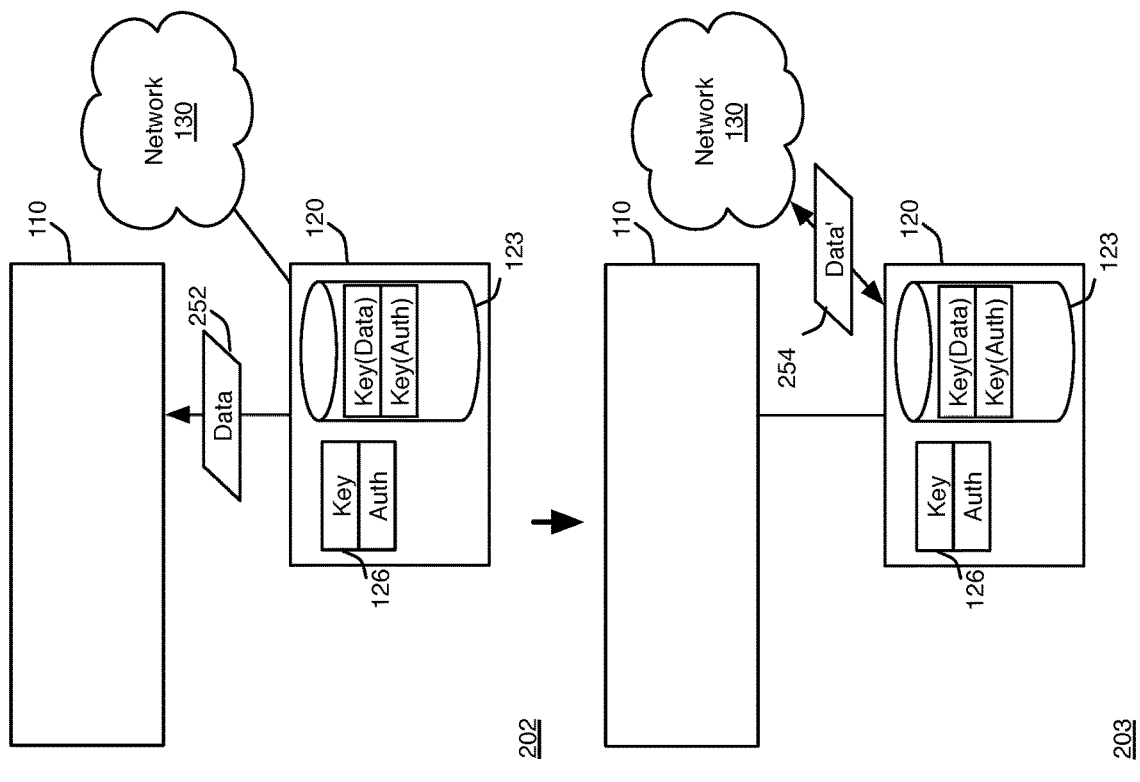
FIG. 2 illustrates an example of decrypting data on a primary device using a key from a trusted secondary device.
Figure 2:
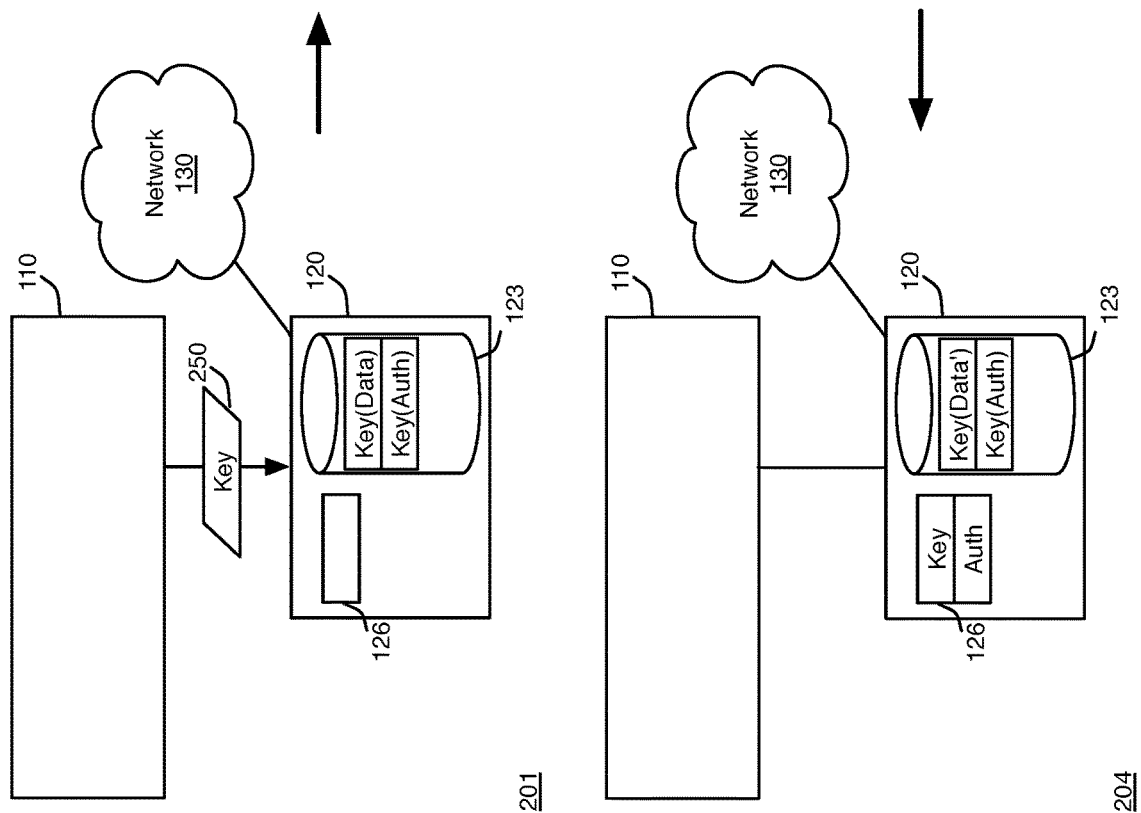

FIG. 2 illustrates an example of decrypting data on a primary device using a key from a trusted secondary device. This example shows primary device 120, secondary device 110, and network 130 as described above with reference to FIG. 1.

The first stage 201 shows that user data has already been encrypted using a key from secondary device 110 and is stored in storage 123. In addition, the first stage 201 shows that the authentication data for the user has also been encrypted and stored in the storage 123. In this example, primary device 120 no longer has the key or the user authentication information in the secure volatile memory 126 because some security event has occurred. A security event of some embodiments may occur when the primary device is shutdown, when the connection between the primary and secondary devices is broken, when a user manually locks the primary device, etc. In some embodiments, the secure, volatile memory 126 is cleared upon such security events in order to maintain security for the primary device 120. The first stage 201 also shows that the primary device 120 receives the key 250 from secondary device 110.

In the second stage 202, the primary device 120 receives the key and determines that the encrypted data in storage 123 was encrypted using the same key. The primary device 120 then uses the key to decrypt the data and the authentication information from the storage 123. The second stage 202 also shows that the primary device 120 sends the decrypted user data to the secondary device 110 and has stored the authentication information in volatile memory 126.

In the third stage 203, primary device 120 uses the decrypted authentication information stored in the volatile memory 126 to request additional data (Data') 252 from the network 130. In some embodiments, the primary device 120 does not store the authentication information. In some such embodiments, the primary device 120 decrypts any previously cached user data, but any requests for new user data requires re-authentication of the user. Alternatively or conjunctively, the stored authentication information of some embodiments is used to unlock a device, providing access to the device, without additional input through a lock screen.

Finally, the fourth stage 204 shows that the new user data (including the previously cached data) has been encrypted with the key received from the secondary device 110. In this example, the new user data is not transmitted to the secondary device 110.

Figure 3:
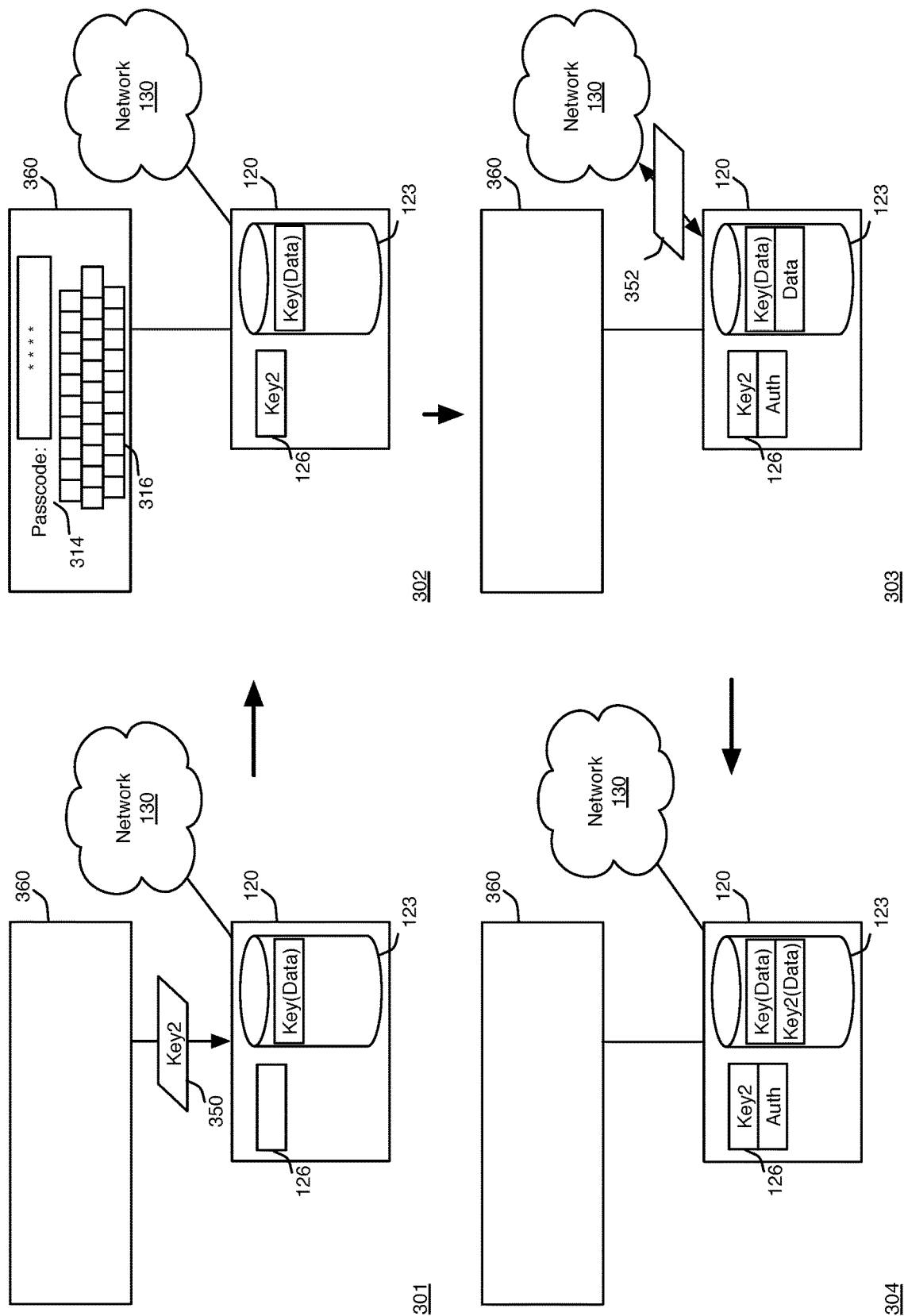
FIG. 3 illustrates an example of decrypting data on a primary device that is connected to an untrusted secondary device.

In some cases, the primary device is connected to an untrusted secondary device. FIG. 3 illustrates an example of decrypting data on a primary device that is connected to an untrusted secondary device. In this example, the primary device 120 is connected to network 130 and stores user data encrypted with a key from a secondary device (e.g., secondary device 110). However, in this example, the primary device 120 is connected to a new secondary device 360, which the primary device 120 has not connected to before. This could occur when the primary device 120 has been stolen and the thief attempts to use the device with another display device or when the user legitimately moves the primary device 120 to another secondary device (e.g., to a new television).

In the first stage 301, the primary device 120 receives a new key (Key2) from the untrusted secondary device 360 as a part of a key negotiation to display DRM-protected content on the secondary device 360. In the second stage 302, the primary device 120 determines that the received key cannot be used to decrypt the encrypted data in the storage 123, and presents a prompt 314 to allow the user to re-authenticate themselves.

The third stage 303 shows that the primary device 120 has re-authenticated the user and stored authentication information in volatile, secure memory 126. Even though the user has been re-authenticated, primary device 120 is still unable to access the encrypted user data in the storage 123 without the original key from the original secondary device that was used to encrypt the data, so primary device 120 communicates with the network 130 to re-retrieve user data 352.

Some devices, in an effort to increase security, automatically discard user data when the primary device 120 connects to an untrusted device, requiring that all of the user's data be re-retrieved after authentication. However, by storing an encrypted version of the user's data, it is no longer necessary to discard the user's information. Even if the primary device has been stolen, the thief will be unable to decrypt the user's information without the key from a trusted secondary device.

Finally, the fourth stage 304 shows that primary device 120 encrypts the data with the new key (Key2) from the secondary device 360 and stores it in storage 323, along with the previously stored encrypted user data (Key(Data)). By storing encrypted user data using both keys, the primary device 120 can provide simplified access to the user's data when connected to either of the trusted devices (i.e., 120 and 360).

However, as more user data is cached on the device, the encrypted user data takes up an increasing amount of space in the storage 123. In some embodiments, the primary device automatically removes encrypted caches to free up space in the storage 123. For example, in some embodiments, the primary device discards encrypted data when the encrypted data is not used for a threshold period of time. In other embodiments, the primary device only stores a single version of the encrypted data, and stores encrypted authentication information or a local key for each trusted device. Some such embodiments are described below in Section II.

Figure 4:
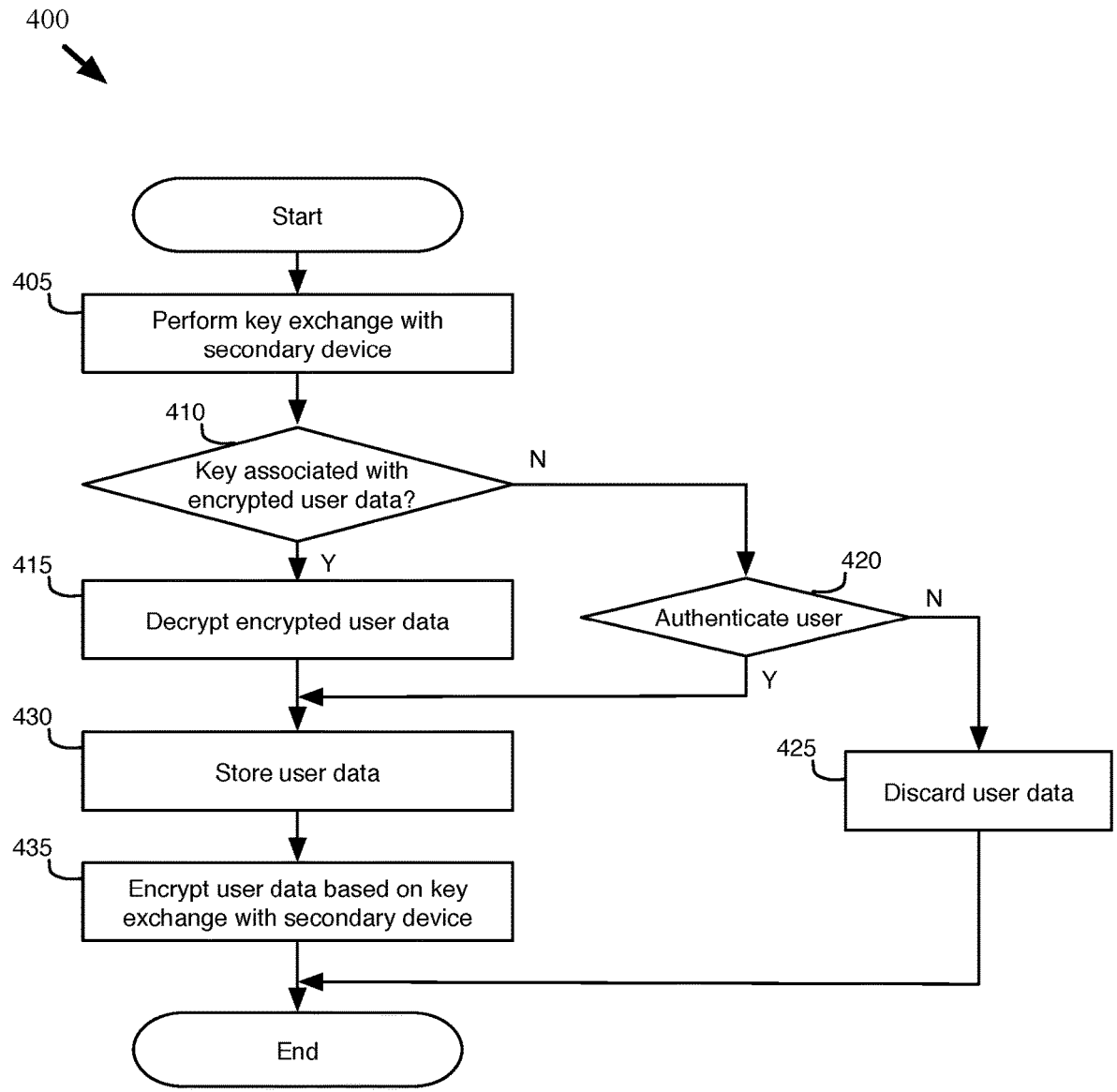
FIG. 4 conceptually illustrates a process for securing user data on a primary device through keys from a secondary device.

FIG. 4 conceptually illustrates a process for securing user data on a primary device through keys from a secondary device. The process 400 begins by performing (at 405) a key exchange with a secondary device. As described above, the key exchange of some embodiments is performed as a part of a DRM protection process that encrypts DRM-protected content sent between the primary and secondary devices.

The process 400 determines (at 410) whether the key is associated with encrypted data that is stored on the primary device. When the process 400 determines (at 410) that there is encrypted user data associated with the key, the process decrypts (at 415) the encrypted user data.

When the process 400 determines (at 410) that there is no encrypted data associated with the key, the process determines (at 420) whether the user is authenticated. When the process 400 determines (at 420) that the user is not authenticated, the process is not allowed access to the user data. In some embodiments, the process 400, either immediately or after a threshold number of authentication attempts, discards (at 425) any user data that is stored on the device. The process then ends.

When the process 400 determines (at 420) that the user is authenticated, or after the process decrypts (at 415) the encrypted user data, the process 400 stores (at 430) user data. The user data may be the decrypted user data or may be retrieved from various networks (e.g., the Internet, a local area network, etc.). Finally, the process 400 encrypts (at 435) the stored user data based on the key received from the secondary device and stores it to a storage on the device. The process then ends.

II. Securing User Data Using a Local Key and a Remote Key

Figure 5A:
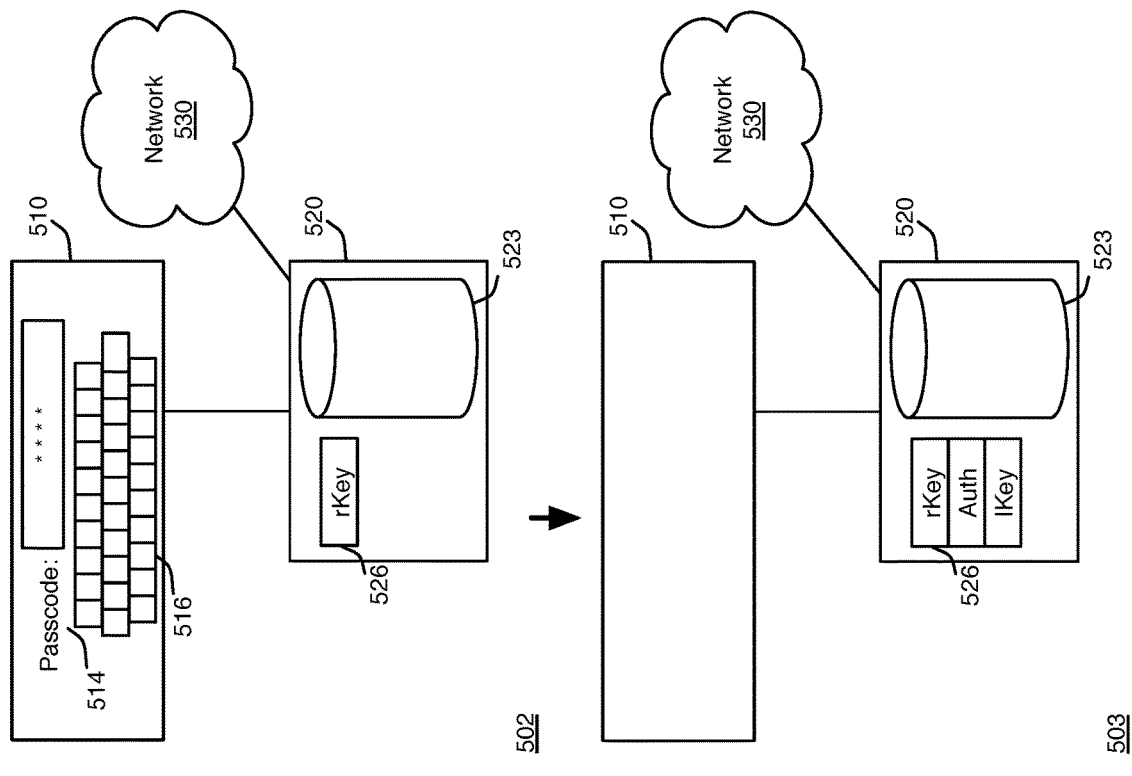
FIGS. 5A-B illustrate an example of encrypting a local key on a primary device using a remote key from a secondary device.
Figure 5A:
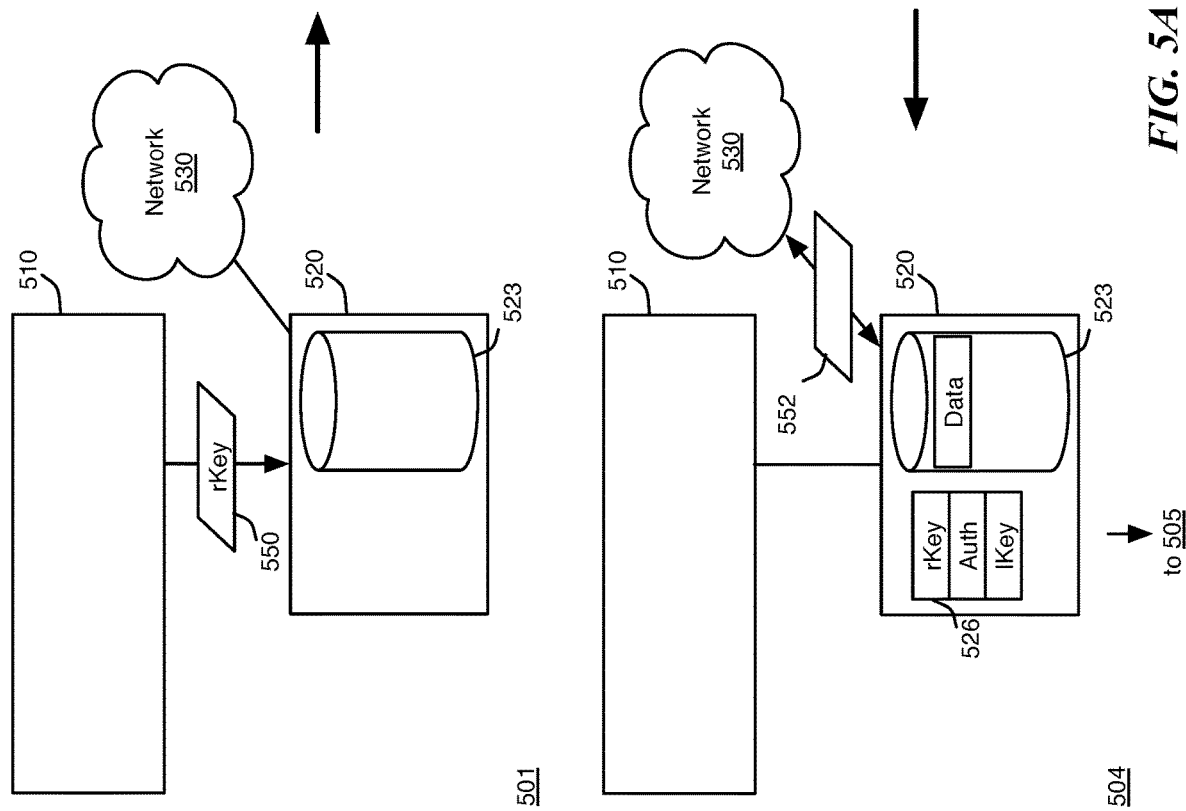
Figure 5B:
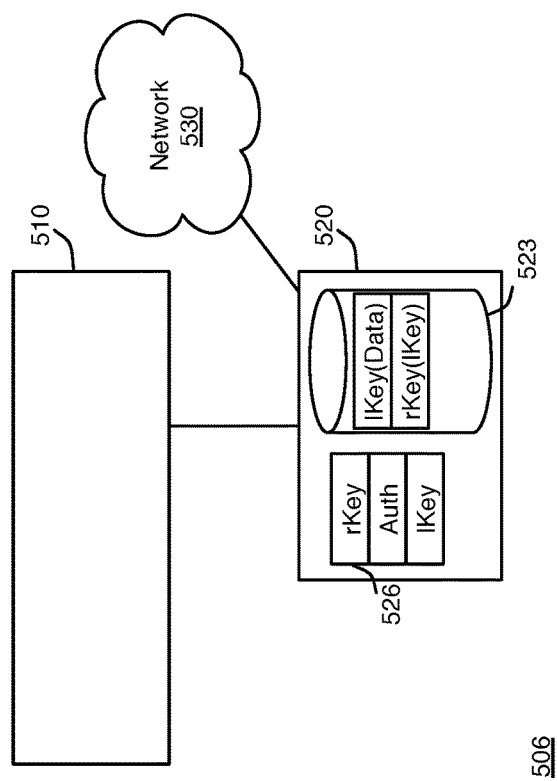
Figure 5B:
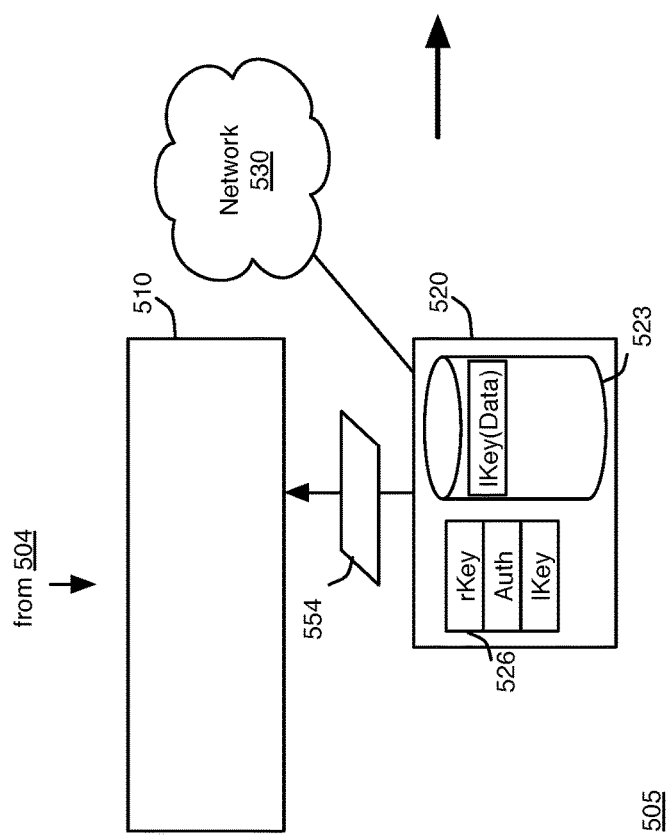

FIGS. 5A-B illustrate an example of encrypting a local key on a primary device using a remote key from a secondary device. Similar to the example of FIGS. 1A-B, this example shows a primary device 520, a secondary device 510, and a network 530 to which the primary device 520 is connected.

The first stage 501 shows that secondary device 510 sends a remote key 550 (i.e., a key remote to the primary device 520) to the primary device 520. As described above, in some embodiments, the key 550 is a public key that was sent as a part of a key negotiation process used to establish a shared key to be used for communications between the primary device 520 and the secondary device 510.

The second stage 502 shows that the primary device 520 has received and stored the remote key on the primary device 520. The second stage 502 also shows that the primary device 520 displays an authentication prompt 514 and on-screen keyboard 516, as described in previous examples, and that the user has entered their authentication information.

In the third stage 503, the primary device 520 has the remote key and the authentication information in the volatile memory 526. In addition, the primary device 520 has generated a local key (lKey) in the volatile memory 526 based on the received authentication information. In some embodiments, the local key is retrieved from a network or generated based on an algorithm based on the authentication information.

The fourth stage 504 shows that the primary device 520 exchanges information 552 with the network 530 and stores it in storage 523. In the fifth stage 505, the primary device 520 sends data 554 to the primary device 510 and encrypts the data stored on the primary device in the storage 523 with the local key (lKey).

Finally, in the sixth stage 506, the primary device 520 encrypts the local key (or authentication data used to generate the local key) with the remote key (rKey) and stores that in the storage 523. By encrypting the user data with the local key and encrypting the local key with the remote key, the primary device 520 of some embodiments is able to maintain a single encrypted version of the user data, even when multiple secondary devices are connected to the primary device 520.

Figure 6:
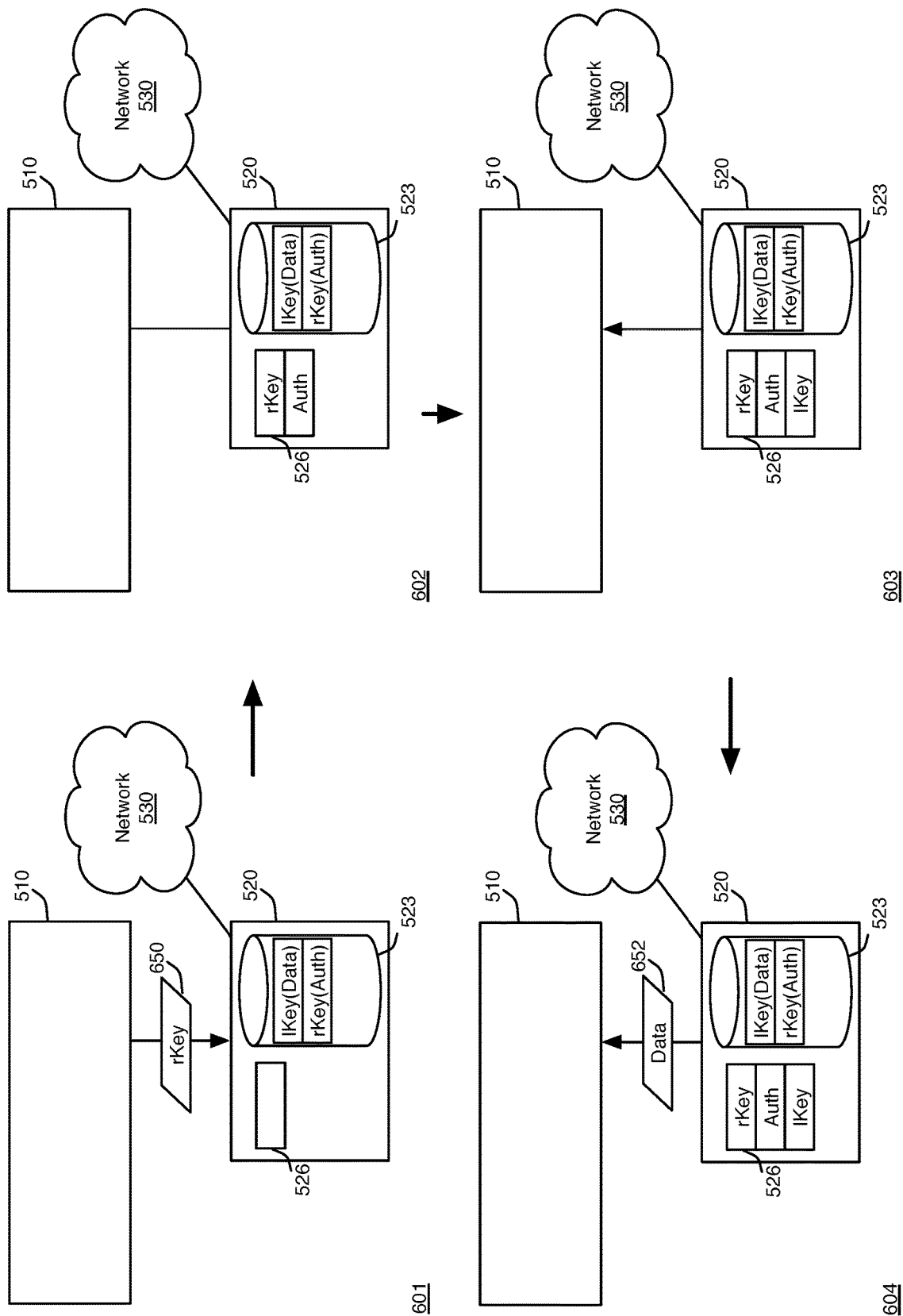
FIG. 6 illustrates an example of decrypting data on a primary device using a protected local key.

FIG. 6 illustrates an example of decrypting data on a primary device using a protected local key from trusted secondary device 510. The first stage 601 shows the primary device 520 with the user data encrypted with a local key and authorization information for generating the local key encrypted with a remote key. The first stage 601 also shows that the primary device 520 receives the remote key 650 from the secondary device 510.

The second stage 602 shows that the primary device 520 has received the remote key and used it to decrypt the authorization information, which is stored with the remote key in the secured volatile memory 526. In the third stage 603, the primary device 520 uses the authorization information to generate the local key and store it in the secured local memory 526. Finally, in the fourth stage 604, the primary device 620 decrypts the user data stored in the storage 523 using the generated local key, and sends the user data 652 to the secondary device 510.

As described above, it is not essential to the invention that the data be sent to or displayed by the secondary device 610. The secondary device 610 provides the remote key to the primary device as a part of distinct and separate process (i.e., to establish a communication channel for DRM-protected content) unrelated to the encrypted user data.

Figure 7:
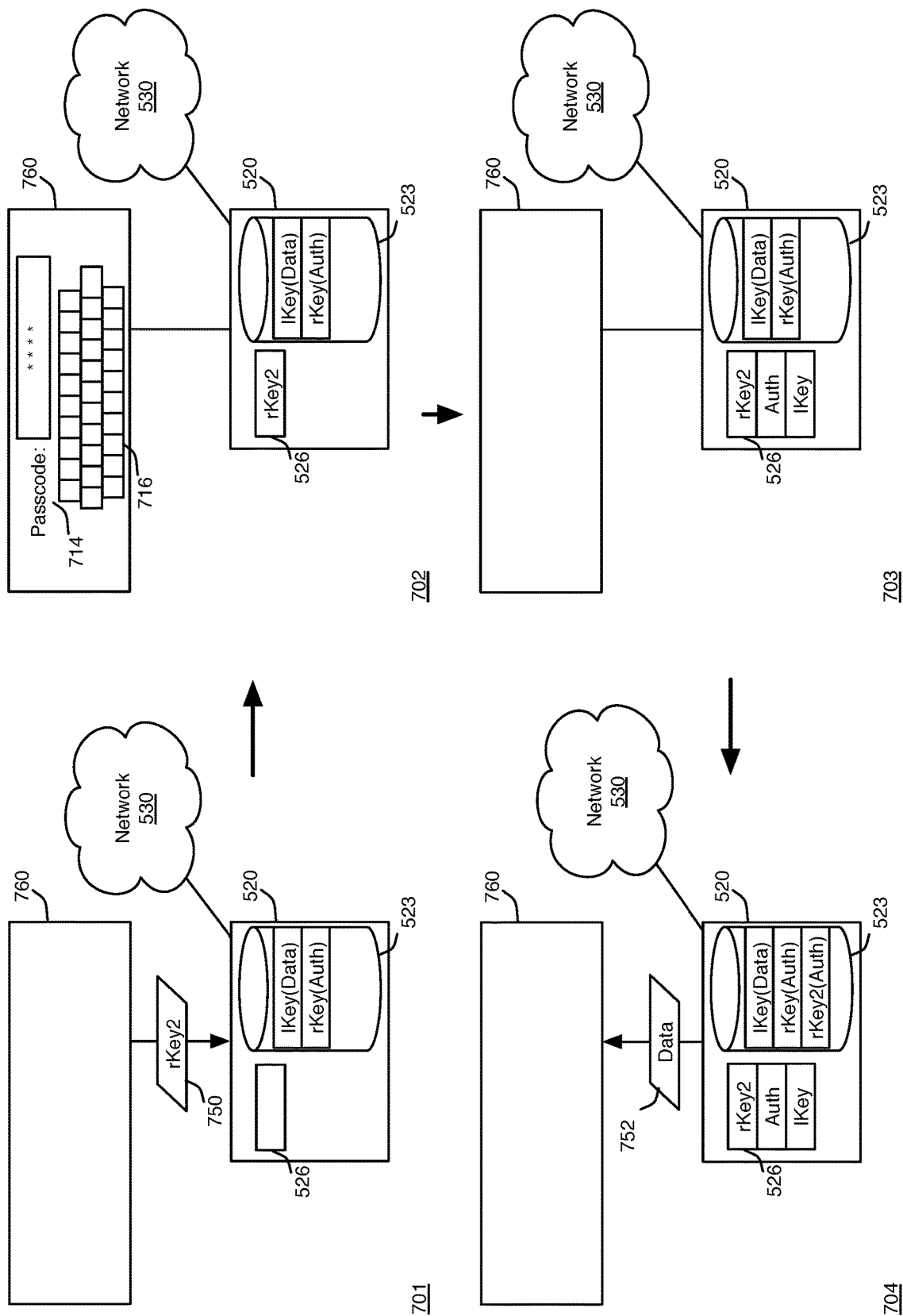
FIG. 7 illustrates an example of protecting data on a primary device based on keys from multiple secondary devices.

By encrypting the user data with a local key, and encrypting only the authorization information or the local key with the remote key from the secondary device, the primary device of some embodiments reduces the amount of space needed to protect and store user data for multiple, trusted, secondary devices. FIG. 7 illustrates an example of protecting data on a primary device based on keys from multiple secondary devices with the primary device 520, secondary device 510, and network 530, as described above with reference to FIG. 5.

The first stage 701 shows that a local key is used to encrypt the data, while a remote key (rKey) is used to encrypt authentication information used to generate the local key. In addition, the first stage 701 shows that the primary device 520 receives a new remote key from an untrusted secondary device 760, similar to the untrusted secondary device 360 as described above by reference to FIG. 3.

In the second stage 702, the primary device 520 stores the new remote key (rKey2) in the secured memory 526, but determines that the new remote key cannot be used to decrypt any authentication data stored in the storage 523 since the authentication information stored in the storage 523 has been encrypted with a different remote key (rKey) from a different secondary device (e.g., secondary device 610 of FIG. 6). The second stage 702 also shows that the primary device 520 displays an authentication prompt 714 to allow the user to re-authenticate themselves.

In the third stage 703, the primary device 520 has received the authentication information from the user and generates the local key (lKey) from the authentication information. The primary device 520 stores both the authentication information and the local key in the secured local memory 526.

Finally, in the fourth stage 704, the primary device 520 decrypts the encrypted user data using the local key, and sends the decrypted data 752 to the new secondary device 760. In addition, the primary device 520 encrypts the authentication data with new remote key (rKey2) and stores it in the storage 523. By only encrypting and storing the authentication information (or the generated local key), rather than all of the user's cached data, the primary device 520 can allow for multiple secondary devices to authenticate a user, while conserving storage space on the primary device.

Figure 8:
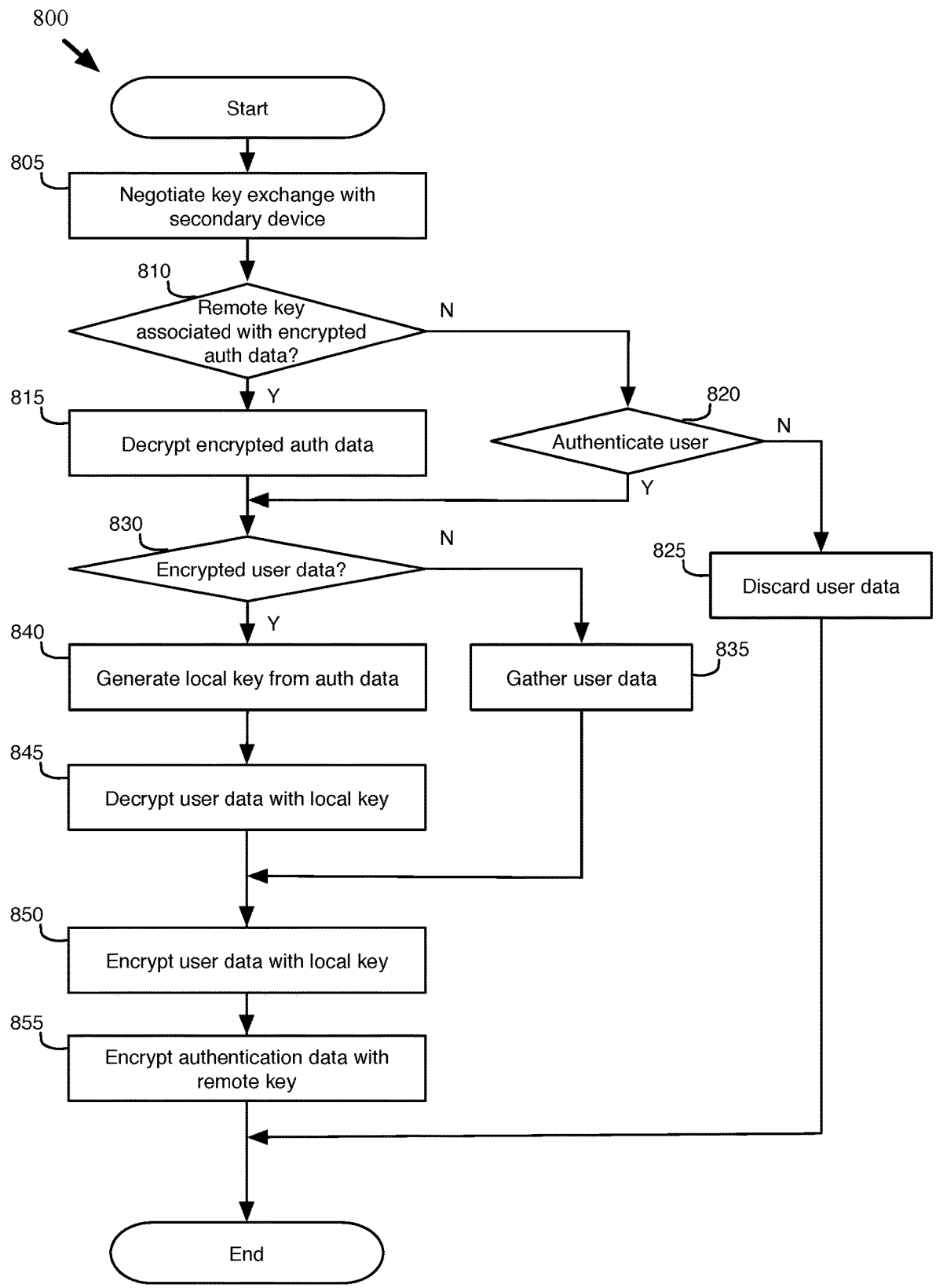
FIG. 8 conceptually illustrates a process for securing keys and user data on a primary device through keys from a secondary device.

FIG. 8 conceptually illustrates a process for securing keys and user data on a primary device through keys from a secondary device. The process 800 begins by performing (at 805) a key exchange with a secondary device to get a remote key. The process 800 determines (at 810) whether the remote key is associated with encrypted authentication data (or a local key generated based on authentication data) that is stored on the device. When the process 800 determines (at 810) that there is encrypted authentication data associated with the key, the process decrypts (at 815) the encrypted authentication data.

When the process 800 determines (at 810) that there is no encrypted authentication data associated with the remote key, the process determines (at 820) whether the user is authenticated. When the process 800 determines (at 820) that the user is not authenticated, the process is not allowed access to the user data. In some embodiments, the process 800, either immediately or after a threshold number of authentication attempts, discards (at 825) any user data that is stored on the primary device and ends.

When the process 800 determines (at 820) that the user is authenticated, or after the process decrypts (at 815) the encrypted authentication data, the process 800 determines (at 830) whether there is any encrypted user data stored on the primary device. When the process 800 determines that there is no cached user data on the device, the process collects (at 835) user data from a network and proceeds to step 850, described below.

When the process 800 determines (at 830) that there is encrypted user data, the process generates (at 840) a local key based on the authentication data decrypted at step 815 or gathered at step 820. In some embodiments, the process 800 encrypts the generated local key, rather than the authentication data, and does not need to regenerate the local key. The process 800 then decrypts (at 845) the encrypted user data using the local key to be used by the primary device.

At 850, the process 800 then encrypts the user data using the local key and stores it to a storage on the primary device to protect the data from unauthorized access. Finally, the process 800 encrypts (at 855) the authentication data (or the generated local key) with the remote key to allow the primary device to use a key received from the secondary device to provide access to the user data. The process 800 then ends.

III. Electronic System

Many of the above-described features and applications are implemented as software processes that are specified as a set of instructions recorded on a computer readable storage medium (also referred to as a computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
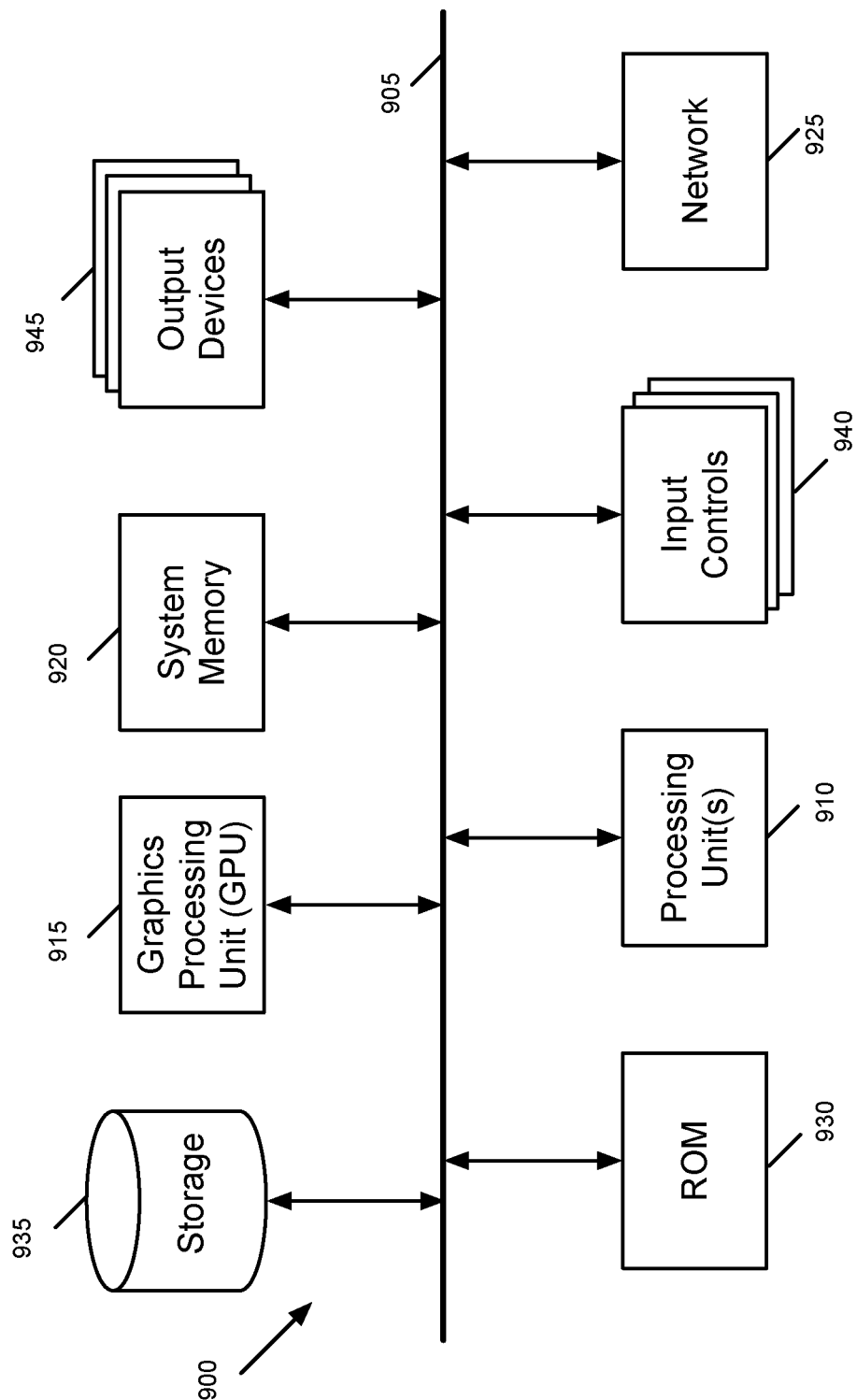
FIG. 9 conceptually illustrates an example of an electronic system with which some embodiments of the invention are implemented.

FIG. 9 conceptually illustrates an example of an electronic system 900 with which some embodiments of the invention are implemented. The electronic system 900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 900 includes a bus 905, processing unit(s) 910, a graphics processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the GPU 915, the system memory 920, and the permanent storage device 935.

From these various memory units, the processing unit(s) 910 retrieves instructions to execute and data to process in order to execute the processes of the invention. The processing unit(s) may be a single processor or a multi-core processor in different embodiments. Some instructions are passed to and executed by the GPU 915. The GPU 915 can offload various computations or complement the image processing provided by the processing unit(s) 910. In some embodiments, such functionality can be provided using CoreImage's kernel shading language.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive, integrated flash memory) as the permanent storage device 935.

Other embodiments use a removable storage device (such as a floppy disk, flash memory device, etc., and its corresponding drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor needs at runtime. In some embodiments, the invention's processes are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet), or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 4 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
retrieving, by a first device and from a second device, a digital rights management (DRM) key for accessing content on the second device;
using, by the first device, the DRM key to decrypt encrypted authentication information stored on the first device; and
using, by the first device, the decrypted authentication information to provide access to a service on the first device by generating a local key from the decrypted authentication information and decrypting an encrypted set of user data using the local key, the service being independent of accessing the content using the DRM key.

2. The method of claim 1, wherein providing access to the service comprises removing a screen lock on the first device.

3. The method of claim 1, wherein the DRM key is retrieved as a part of a high-bandwidth digital content protection (HDCP) scheme.

4. The method of claim 1, wherein providing access to the service comprises directing the first device to play another content.

5. The method of claim 4, wherein the content is audio content or video content stored on the first device.

6. The method of claim 4, wherein the content is streaming audio content or streaming video content that the first device retrieves from a third device communicatively coupled to the first device through a network.

7. The method of claim 1, wherein the decrypted authentication information comprises a decrypted parameter that is stored on the first device.

8. The method of claim 7, wherein the decrypted parameter is at least one of a decryption key, a service-access token, or a password.

9. The method of claim 7, wherein using the decrypted parameter comprises:
generating the local key from the decrypted parameter.

10. The method of claim 7, wherein the decrypted parameter is an access control parameter for restricting access to the first device, wherein the access control parameter is a passcode or a gesture input.

11. A non-transitory machine readable medium storing a program which when executed by at least one processor, causes the at least one processor to perform operations, the program comprising sets of instructions for:
retrieving, by a first device and from a second device, a digital rights management (DRM) key for accessing content on the second device; and
using, by the first device, the DRM key to decrypt encrypted authentication information stored in a memory of the first device to provide access to a service on the first device by generating a local key from the decrypted authentication information and decrypting an encrypted set of user data using the local key, the service being distinct from accessing the content using the DRM key.

12. The non-transitory machine readable medium of claim 11, wherein the program further comprises sets of instructions for:
determining that the second device communicatively couples to the first device and has the DRM key that allows access to the service on the first device;
wherein retrieving the DRM key from the second device is performed after the determination that the second device communicatively couples to the first device and has the DRM key.

13. The non-transitory machine readable medium of claim 12, wherein the program further comprises a set of instructions for, before the determination that the second device communicatively couples to the first device and has the DRM key, determining that the first device stores an encrypted access control parameter that is encrypted using a DRM key from another device.

14. The non-transitory machine readable medium of claim 12, wherein the program further comprises sets of instructions for:
before the determination that the second device communicatively couples to the first device and has the DRM key, determining that the first device stores a plurality of encrypted access control parameters that are each encrypted by using a DRM key from one of a plurality of other devices that have previously communicatively coupled with to the first device; and
wherein determining that the second device communicatively couples to the first device comprises determining whether any of the previously communicatively coupled devices is currently communicatively coupled to the first device.

15. The non-transitory machine readable medium of claim 14, wherein the program further comprises a set of instructions for providing a prompt to provide an access control parameter to access the service when it is determined that none of the previously coupled devices are currently coupled to the first device.

16. The non-transitory machine readable medium of claim 15, wherein the access control parameter includes at least one of a username, password, passcode, gesture input, and service-access token.

17. The non-transitory machine readable medium of claim 11, wherein the first device is a streaming media player and the second device is a monitor or projector.

18. The non-transitory machine readable medium of claim 11, wherein the first device is a mobile device and the second device is an information system of a vehicle, wherein the set of instructions for using the DRM key comprises a set of instructions for allowing the information system to access content on the first device.

19. The non-transitory machine readable medium of claim 11, wherein the retrieved DRM key is received from the second device as a part of a key exchange process.

20. The non-transitory machine readable medium of claim 11, wherein the DRM key is a first DRM key, the program further comprising sets of instructions for:
from a third device communicatively coupled to the first device, retrieving a second DRM key for accessing content on the third device; and
using the second DRM key to provide access to the service on the first device.

21. The non-transitory machine readable medium of claim 11, wherein the key is retrieved as a part of a high-bandwidth digital content protection (HDCP) scheme.

22. A device comprising:
a memory configured to store encrypted authentication information; and
at least one processor configured to:
retrieve, from another device, a key for accessing content on the other device; and
use the key to decrypt the encrypted authentication information stored in the memory; and
use the decrypted authentication information to provide access to a service on the device by generating a local key from the decrypted authentication information and decrypting an encrypted set of user data using the local key, the service being distinct from accessing the content on the other device using the key.

23. The device of claim 22, wherein the key is retrieved as a part of a high-bandwidth digital content protection (HDCP) scheme.

* * * * *